May 26, 1931. W. O. MEISSNER 1,806,697
COIL WINDING MACHINE
Filed Aug. 22, 1929 6 Sheets-Sheet 1

Inventor
William O. Meissner
By
Attys.

May 26, 1931.  W. O. MEISSNER  1,806,697
COIL WINDING MACHINE
Filed Aug. 22, 1929   6 Sheets-Sheet 3
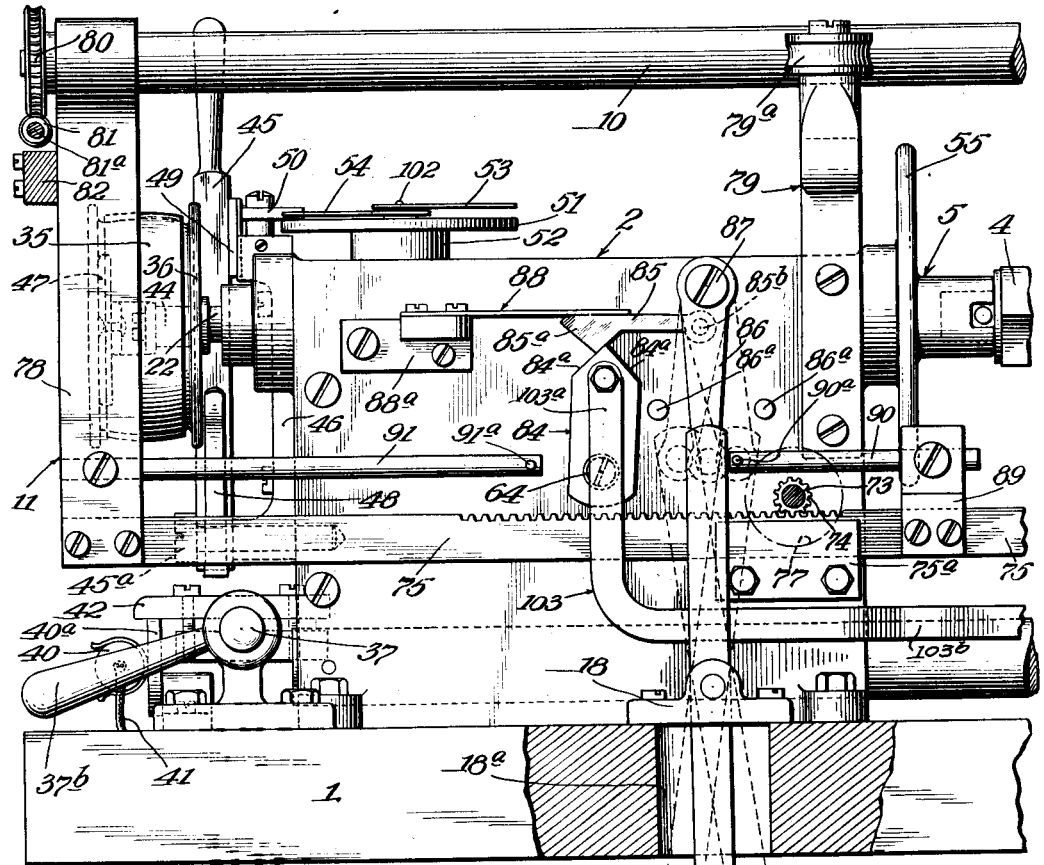
Fig. 3.
Fig. 4.
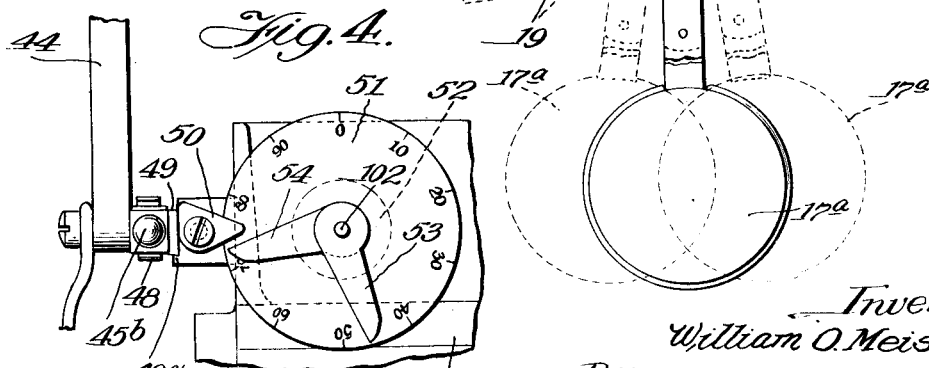
Inventor
William O. Meissner.
By
Attys:

Inventor
William O. Meissner

May 26, 1931. W. O. MEISSNER 1,806,697
COIL WINDING MACHINE
Filed Aug. 22, 1929 6 Sheets-Sheet 5

Inventor
William O. Meissner

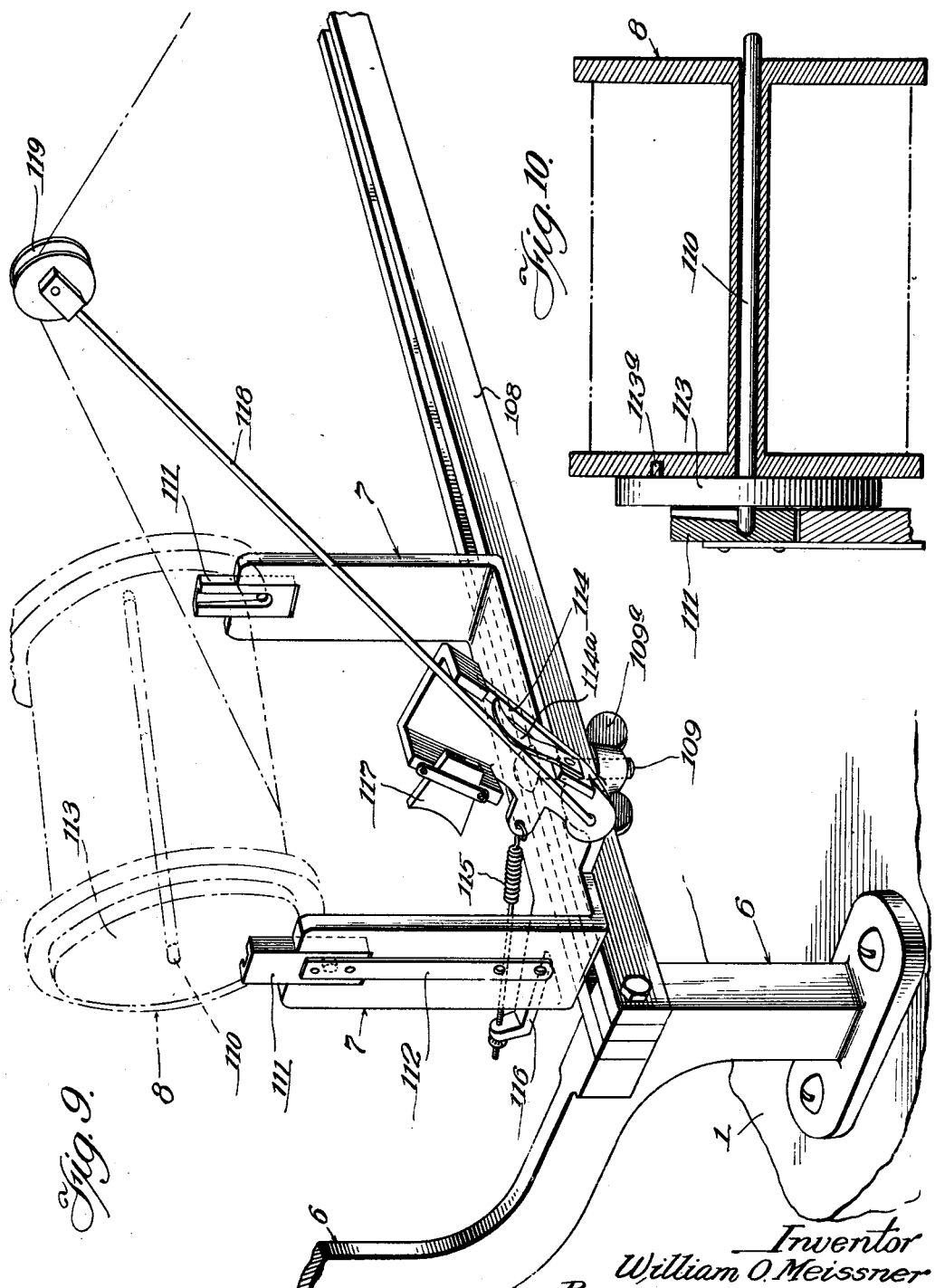

Patented May 26, 1931

1,806,697

UNITED STATES PATENT OFFICE

WILLIAM O. MEISSNER, OF CHICAGO, ILLINOIS, ASSIGNOR TO THE MEISSNER MANUFACTURING COMPANY, OF CHICAGO, ILLINOIS, A CORPORATION OF ILLINOIS

COIL WINDING MACHINE

Application filed August 22, 1929. Serial No. 387,602.

This invention relates to improvements in coil winding machines, and more particularly to a machine for winding coils of relatively light insulated wire, such as are used in the construction of radio receiving sets, and like electrical apparatus.

A particular type of coil for which the machine of the present invention is designed to wind, is known as a paper-insulated coil, that is, one in which the several superimposed layers of wire are separated and insulated by layers of waxed paper. Generally speaking, the operation of winding a coil is similar to that of winding thread onto a bobbin. The wire is fed from a spool onto a rotating core by means of a reciprocating guide which travels back and forth, applying the turns of wire in evenly disposed layers of the required number of turns in superimposed relation. Coil winding, however, demands care and accuracy both in the number of turns of wire used and in the handling of the wire to avoid damaging the varnish-like insulating coating. Moreover, in a paper-insulated coil the strips or sheets of insulating paper must be introduced between each layer of wire at exactly the right moment, namely, at the completion of the last turn of each layer, so that there will be no contact between said last turn and the first turn of the succeeding layer, for otherwise there would be opportunity for short-circuiting and consequent imperfection in the coil. Heretofore it has been the practice for operators to feed the paper strips between the layers by hand, depending on the accuracy of the eye to perform the operation at the proper instant. A rocking table or rack is used for this purpose, the sheet being placed on the table with its forward edge projecting in readiness to be inserted. When the last turn is completed the operator rocks the table forward, carrying the paper into contact with the revolving wire, whereupon it wraps itself around the completed layer just before the next layer is started.

One of the objects of the present invention is to provide means for automatically feeding the insulating sheets into the coil by mechanism which rocks the feed table at the proper instant, being synchronized with the winding mechanism so that it functions at the proper instance with unerring precision, so that the operator merely positions the sheets on the table.

A further object of the invention is to improve generally upon the winding mechanism disclosed in my prior Patent No. 1,515,309 granted to me on November 11, 1924, with a view of promoting greater accuracy and uniformity in the winding operation. The several improved features of construction will be described more at length in connection with the accompanying drawings, in which Figure 1 is a top plan view of the machine.

Figure 3 is an enlarged detail view in front elevation of the head end of the winding mechanism.

Figure 4 is a top plan view of the brake lever releasing mechanism.

Figure 9 is a perspective view of one of the spool holding racks; and

Figure 10 is a view in vertical section through the spool mounted on its spindle.

Figure 1:
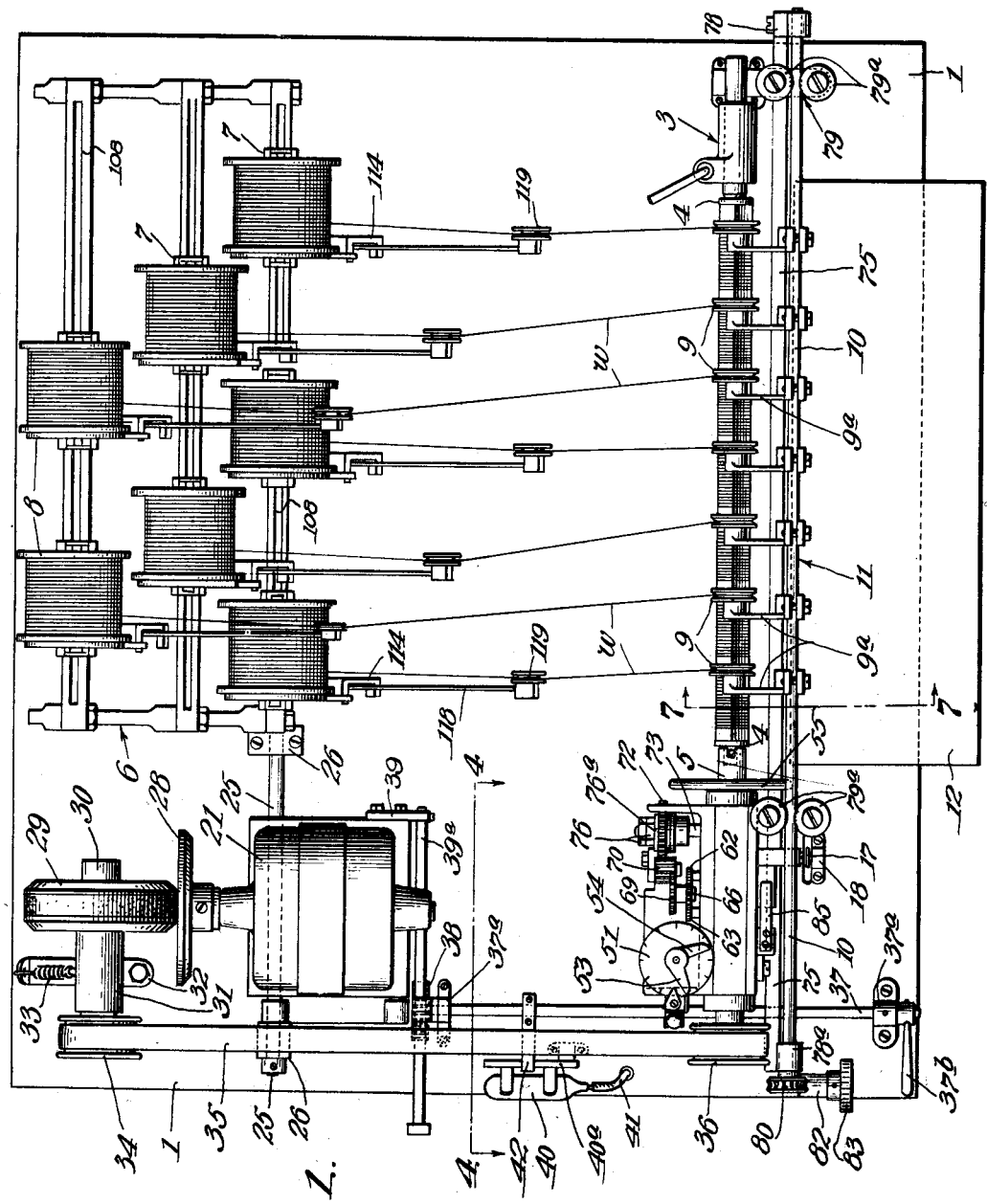

In the machine about to be described, it will be observed that it is designed to wind a plurality of coils (six) at one time, which manifestly is but a matter of winding from several coils onto a long core, duplicating the same coil winding at intervals and then severing the core between the several coils. This is merely one adaptation of the "gang" method of production, so that the principle of operation of the machine is the same whether the capacity is one or several coils.

Referring first to the general arrangement of the several parts of which the machine is comprised, the base or foundation is a table 1 supported on legs 1a, and on which the wire winding and paper feeding mechanisms are mounted. The apparatus is arranged so that the operator sits in front of the table and places the sheets of insulating paper onto the feed table, and otherwise oversees the operation of the machine.

The winding mechanism is mounted adjacent the front edge of the table and resembles somewhat a turning lathe, having a power head consisting of a housing 2 in which a power-driven shaft or spindle is mounted. At a distance from the power head is a tail stock 3 for rotatively supporting one end of a mandrel 4 adapted to be removably inserted between it and a chuck-like member 5 at the end of the housing 2 and rotating with the spindle. The mandrel carries the paper cores onto which the coils are wound. Immediately behind the winding mechanism is a frame 6 supporting a battery of spool-holding members 7 arranged in rows elevated one above the other. The wire $w$ from the spools 8 mounted on removable spindles is led forwardly to a series of small guide pulleys 9 journalled at the ends of arms 9a spaced apart at intervals along a horizontal round bar 10 forming a part of a carriage 11 driven by gearing from the spindle in the power head 2, the travel of said carriage being adjustable to the length of the coil to be wound.

Mounted in front of the mandrel 4 is a rocking table 12 (Figures 1, 2 and 7) having its top surface substantially in a horizontal plane passing through the axis of the mandrel. This table, the length of which is the same as that of the mandrel 4, is mounted for forward and backward rocking motion on pairs of vertical rocker arms 13, 13 pivotally mounted at the lower ends on brackets 13a secured to the supporting table 1 near its forward edge at their lower ends, and at their upper ends with similar brackets 12a attached to the underside of the rocking table.

Supported beneath one end of the rocking table 12 is a small electric motor 14 having a circular plate 14a fixed to its armature shaft. A link 15 offset from the axis of the disc 14a connects the same with the adjacent outer rocker arm 13, whereby the table is rocked periodically with a quick forward and return motion at a predetermined instant, namely, at the completion of each winding in either direction by a single revolution of the motor 14 acting through the connecting link 15. It may be explained that the electric current is supplied to the motor 14 for only the short period required for its periodic revolutions, the current input being controlled by a pair of mercury switches 16, 16 which are mounted below the supporting table 1 on a pendulum 17 suspended from a journal bracket 18 on top of said table, and passing through a slot 18a therein just below the bracket (Figure 3). A bracket 19 with supporting clips extends crosswise of the pendulum below the table and holds the switches in position at right angles to the pendulum and on opposite sides thereof, said pendulum being adapted to be swung from side to side by force imparted at its upper extended portion, and its movement being controlled by the weight 17a at its lower end. Conductors 20, 20 connect the motor 14 with the switches, the latter being connected in series with the current supply conductors, and act alternately to open and close the circuit with the swinging of the pendulum in either direction. Since it is vitally important that the rocking feed table 12 be actuated at the precise moment the winding of each layer of wire is completed, additional timing mechanism in the form of an escapement device is employed, its primary purpose being to compensate for inertia of the motor and other forces resisting the quick functioning of the motor. The mechanism will, however, be described later.

Figure 2:
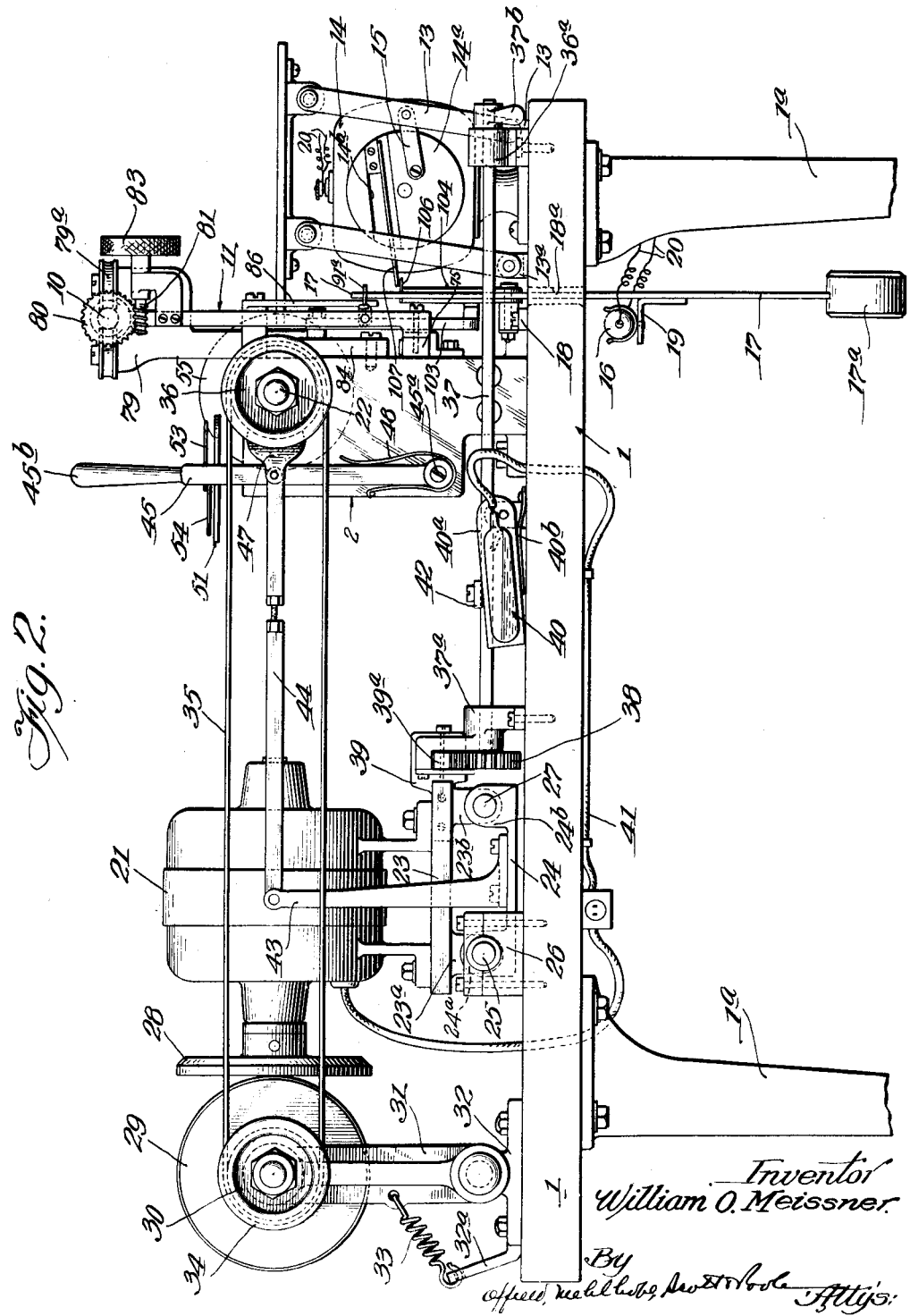
Figure 2 is a view of the machine in side elevation.

The power for the winding mechanism is derived from an electric motor 21 mounted at the rear left-hand corner of the supporting table 1, the power being transmitted through a friction-drive belt transmission to the spindle 22 journalled in the housing 2. As seen in Figures 1 and 2, the motor 21 is mounted on a base plate 23 with the axis of its armature shaft extending from front to rear or at right angles to the axis of the spindle 22. The motor base plate 23 in turn is mounted on a sub-base plate 24, which is supported clear of the surface of the table on a shaft 25 supported in bearings 26, 26 bolted to the table, said shaft passing through a pair of upstanding ears 24a at the rear corners of the sub-base plate 24, and also through depending ears 23a integral with the upper base plate 23 and located centrally of its rear edge. At the forward edge of the sub-base plate 24 is a corresponding pair of upstanding ears 24b supporting a rod 27. The upper base plate 23 has a pair of depending ears 23b at its forward edge through which said rod 27 passes. With this arrangement, the motor 21 with the upper base plate 22 is capable of sliding bodily upon the rods 25 and 27 for a limited distance laterally in both directions, and likewise to be tilted in a forwardly and rearwardly direction by the elevation of the sub-base plate about its fulcrum, namely, the axis of the rearmost rod 25.

The reason for the shifting and tilting of the motor will be apparent after the friction drive has been described. Mounted on the rear end of the armature shaft of the motor 21 is a driving friction disc 28 which drives a friction disc 29 mounted on a shaft 30 journalled at the upper end of a vertical arm 31, said friction disc 29 being positioned to bear edgewise against the driving disc 28. The arm 31 which supports the disc 29 is pivotally mounted at its lower end on a bracket 32 bolted to the table. A coil spring 33 connected at one end with an arm 32a of said bracket 32 extends to a point intermediate the ends of said arm 31, acting to yieldably hold the driven disc 29 against forward movement toward the driving disc 28. On the shaft 30 which carries the driven disc 29 is a belt pulley 34, a belt 35 extending therefrom to a corresponding pulley 36 on the outer end of the spindle 22 of the power head 2. Thus assuming that the driven disc 29 remains in fixed position subject to slight variation governed by the spring 33, the motor may be disconnected from the transmission in two ways first, by sliding the motor sidewise until the face of the driven disc 29 is opposite the center of the driving disc 28, the latter being recessed so that there is no driving contact, or secondly, by tilting the motor sub-base plate 24 so that the forward end of the motor is depressed, thus shifting the driving disc 28 out of frictional contact with the driven disc 29.

It is to be observed, however, that the shifting of the motor laterally is controlled by hand, as when starting or stopping the machine, whereas the second mode of interrupting the transmission of power is controlled automatically and functions when a predetermined number of turns have been wound on the coil and the winding machine is stopped to remove the completed coils and to insert a new core into the machine, the motor continuing to rotate, awaiting the resuming of the winding operation, just as a clutch is thrown in or out in any system of power transmission. However, in the manual or hand control of the power, the current to the motor is shut off and turned on with the shifting of the motor. And finally, it is to be observed that the lateral shifting of the motor serves as a change speed control inasmuch as the speed of the winding spindle is proportional to the radius at the point of contact of the driven friction disc with the face of the driving disc, as is the method of speed control in nearly all types of friction drive transmissions.

The means for shifting the motor 21 laterally and simultaneously starting and stopping the same consists of a shaft 37 extending along the left side edge of the table 1 (Figure 1) and journalled in bearings 37a. At the forward end of the shaft is a handle 37b, and at the rear end is mounted a pinion 38.

Fixed to the forward edge of the motor base plate 23 is a bracket 39 to which is pivotally connected one end of a rack bar 39a extending transversely of the shaft 37 and meshing with the pinion 38, so that by rotating the shaft through one-half of a turn (as permitted by the handle 37b), the motor 21 with its base plate 23 is shifted along the bars 25 and 27 and the disc 28 into or out of driving engagement with the disc 29. Mounted on the table 1 adjacent the shaft 37 is a mercury switch 40 mounted on rocking supporting bracket 40a said switch being connected in series with the conductor 41 which supplies current to the motor in the usual manner. A leaf spring 40b beneath the switch normally holds the switch tube in position to open the circuit, as shown in Figure 2. Mounted in the shaft 37 is a lever arm 42 bearing on the pivoted switch support 40a and acts to depress the same when the shaft is rotated to close the circuit through the motor at the same time it is shifted into frictional driving position, and to release the same, allowing the switch to be tilted back in open position by the spring 41b to stop the motor as the friction discs disengage.

Figure 5:
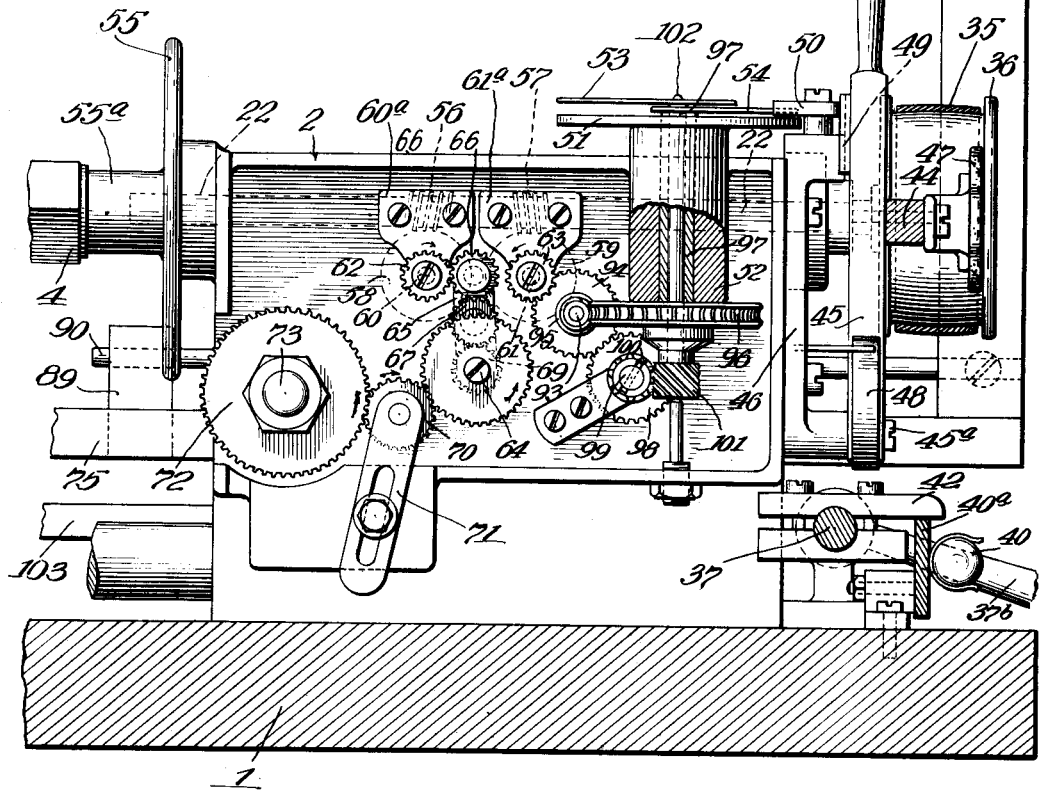
Figure 5 is an enlarged detail view in rear elevation of the head end of the winding mechanism.

The means for automatically tilting the motor for starting and stopping the winding mechanism consists of the following parts: Bolted fast to the motor sub-base plate 24 is a vertical arm 43 (Figure 2), and connected to its upper end is a long link 44 extending forwardly and terminating in pivotal connection with a vertical brake lever 45 pivotally mounted at its lower end on a bearing bracket 46, bolted to the end wall of the housing 2 of the power head. The upper end of the brake lever terminates in a handle 45b used for setting the lever. Fixed to the brake lever just forwardly of the end of the link 44 is a brake shoe 47 adapted to have braking engagement with the outer edge and flange of the belt pulley 36. A leaf spring 48 bears against the lower end of the brake lever forcing it in a rearward direction. As shown in Figures 3 and 4, the brake lever has a catch member 49 secured to its inner side face just below the handle, the same having a rearwardly facing edge normally engaging a forwardly facing detent 49a at the upper end of the face plate 46 supporting said brake lever, the contact of these two members holding the motor in frictional driving engagement through the intermediate link 44. Pivotally mounted on the top edge of the face plate 46 is an eccentric dog 50 having the edge bearing against the catch member 48 and a finger projecting radially inward beyond the periphery of a horizontal disc or dial 51 mounted at the upper end of a vertical cylindric section 52 of the housing 2 and located at the rear and near the outer (right) end thereof, as shown in Figure 5.

As will be presently seen, revolving pointers or hands 53 and 54 turn on the face of the dial, the lower pointer 54 being driven from the spindle 22 through a train of reducing gears so that for every 10000 revolutions of the spindle, the pointer makes one revolution. Thus when the pointer has completed one revolution (or any portion thereof) the pointer strikes the dog 50 which in turn releases the brake lever by disengaging the catch member 48 from the detent 49 thus allowing said brake lever to swing rearwardly and permitting the motor sub-base plate 24 to be depressed, interrupting the friction drive. As the brake lever is released, it is at the same time thrown outwardly toward the belt pulley 36, and in so doing the brake shoe 47 is brought into contact with the flanged outer edge thereof and stops the spindle 22 immediately so that no more turns of wire will be wound onto the core.

Figure 6:
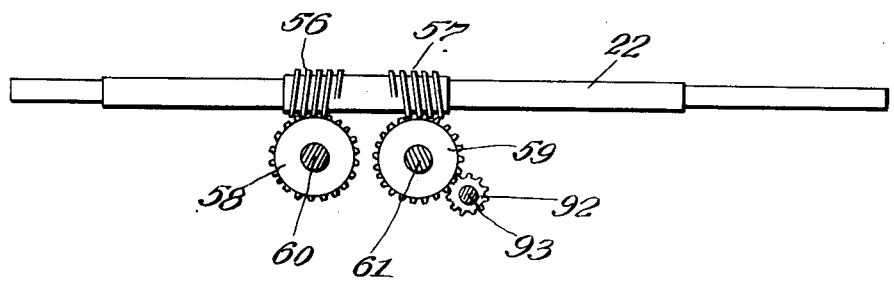
Figure 6 is a detail view of the spindle.

Referring now to the housing 2, the spindle 22 extends lengthwise thereof, being journalled in suitable bearings near each end of the housing. The outer end of the spindle carries the belt pulley 36 (already described) while its inner end extends from the opposite side of the housing and carries a disc 55 and the chuck-like member 5 slotted and recessed at its end to receive one end of the removable mandrel 4 on which the paper cores of the coils are mounted. Intermediate the ends of the spindle 22 and within the housing 2 are mounted two worms 56 and 57, left and right-hand respectively, each meshing with a worm wheel 58 and 59 just below, the worm wheels being mounted on shafts 60 and 61 together with pinions 62 and 63, the shafts being journalled in bearing 60a and 61a fixed to the rear wall of the housing with the pinions 62 and 63 exterior thereof (Figures 3, 5 and 6). Extending through the housing at a point below and symmetrically between the pinions 62 and 63 is a rock shaft 64 having an arm 65 keyed thereto and extending upwardly between said pinions. At the upper end of this arm 65 is journalled a pinion 66 occupying the space between the two pinions 62 and 63 so that with the rocking of the supporting arm 65, the intermediate pinion 66 is shifted into mesh with one or the other of them. The intermediate pinion 66 is in constant mesh, however, with a pinion 67 journalled on the arm 65 just below it, which in turn meshes with a third pinion 68 journalled on the rock shaft 64, and integral with a larger gear wheel 69. These pinions and gears form a train turning in either direction, depending on whether it is driven through the left or right-hand worm driven pinions 62 and 63. The large gear wheel 69 turning on the axis of the rocking lever shaft 64 meshes with an idler pinion 70 immediately to the left (Figure 5) and journalled on an endwise adjustable arm 71 bolted to the rear face of the housing. This idler pinion in turn meshes with a large gear wheel 72 on its left, which is loosely mounted on a shaft 73 also passing through the housing to the front face thereof where it carries a small pinion 74 meshing with a rack bar 75 (Figure 3) slidably mounted in guides 75a. The gear wheel 72 is loosely mounted on the shaft 73 in that it is not keyed thereto, but has frictional engagement therewith through a pair of friction units 76, 76 and a friction washer 76a capable of adjustment so that the shaft may be turned by hand without turning the entire train of gearing back to the spindle 22, for the purpose of adjusting the position of the rack 75, the hand turning being accomplished by a hand wheel 77 mounted at the forward end of said shaft 73.

The rack bar 75 forms the lower horizontal member of the reciprocating frame or carriage 11 of which the round bar 10, carrying the wire guiding pulleys 9 and supporting arms 9a, forms the upper and horizontal member, the frame being completed by two vertical connecting end members 78, 78 (Figure 3). This carriage is supported in a vertical plane from two fixtures 79, 79, one being secured to the housing 2 near its inner end, and the other being mounted on the table 1 just beyond the tail stock 3 (Figure 1). At the upper ends of the fixture 79 are pairs of grooved rollers 79a, 79a turning on vertical axes on either side of the upper carriage bar 11, and support the carriage between them. The end members 78, 78 of the carriage have rigid connection at their lower ends with the rack bar 75, but at their upper ends are rounded and bored to form bearings 78a for the round upper bar 10 of the carriage 11, the latter being thus capable of rotation through an adjusting device at the left end of the carriage (Figure 3), consisting of a worm wheel 80 mounted on the bar 10 and meshing with a worm 81 keyed to a shaft 81a journalled in a bracket 82 mounted on the adjacent end frame member 78, said shaft carrying also a hand-adjusting wheel 83. The purpose of this adjustment is to turn the bar 10 so as to turn the wire guiding pulley supporting arms 9a, thus moving the pulleys to and from the coil being wound.

Figure 7:
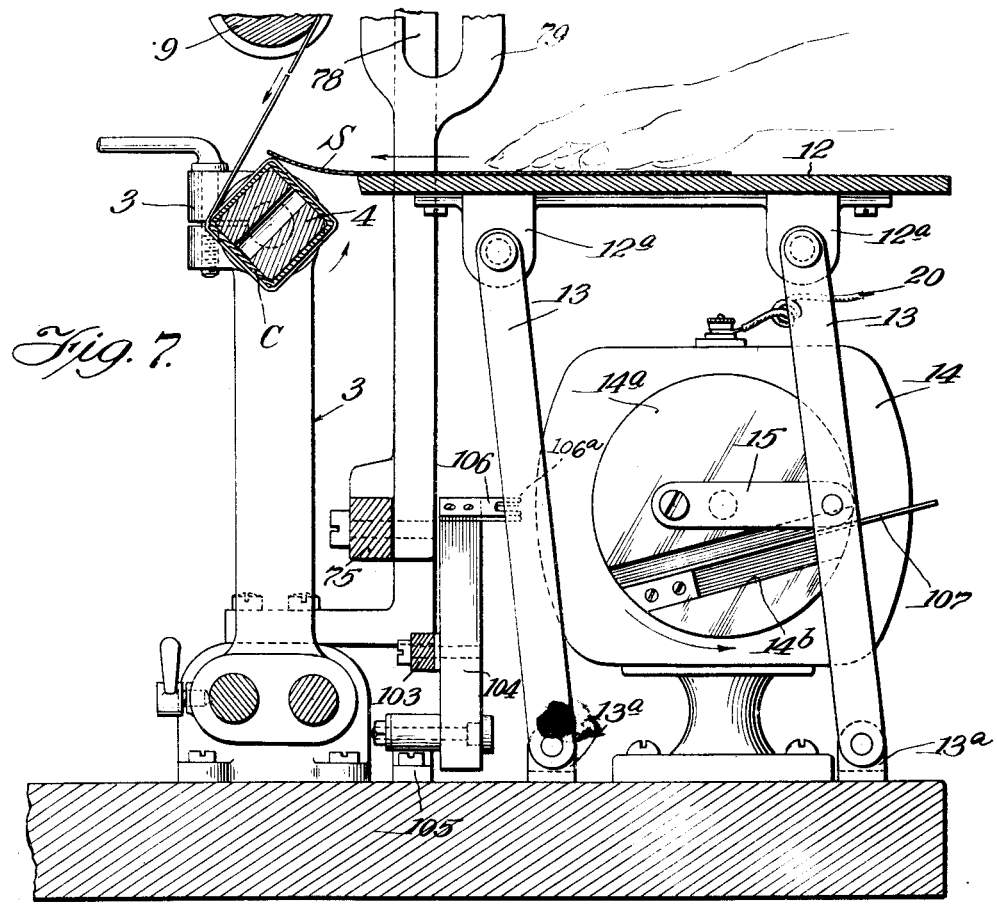
Figure 7 is an enlarged detail view in vertical section through the sheet feeding table as taken on line 7—7 of Figure 1.
Figure 8:
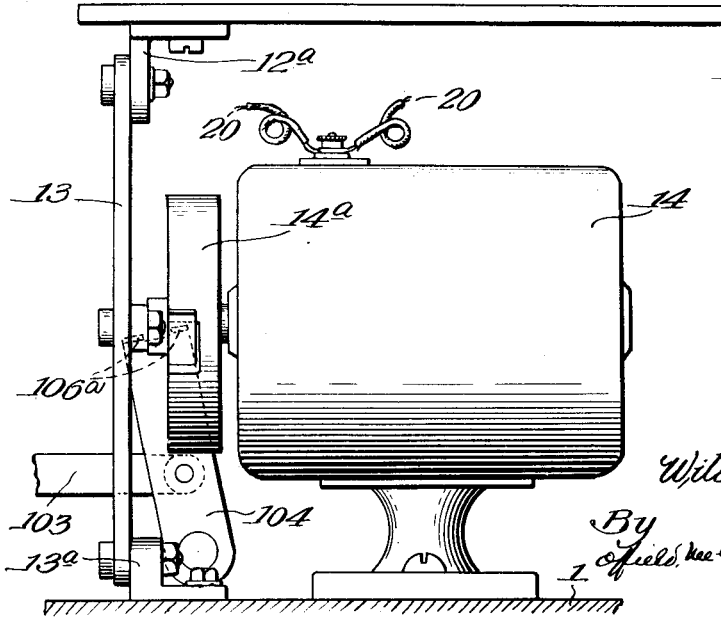
Figure 8 is an enlarged detail view in front elevation of the motor and driving parts for the sheet feeding table.

At this point in the description of the machine it is now possible to trace through the winding mechanism starting with the spindle 22 which drives the mandrel 4 on which are mounted the cores C, preferably square in section, and onto which the wire is to be wound in superimposed layers of a length determined by the travel of the carriage in each direction (Figure 7). As will now be seen, the carriage is driven through the train of gearing on the rear face of the housing 2 which is designed so that speed of reciprocating movement of the carriage is correctly proportioned to the speed of rotation of the spindle, (there being necessarily a considerable reduction in transmitting the power from the spindle through the gear train) and finally to the rack bar 75 of the carriage.

But since the winding of the coil is a continuous operation and an exact number of turns of wire for each layer, it is desirable that the reciprocation of the carriage be accurately adjusted or timed. The following mechanism accomplishes this function: Returning now to the rock shaft 64 supporting the pinion 66 intermediate the worm-driven pinions 62 and 63, it was stated that they rotate in opposite directions, being driven from the left and right-hand worms on the spindle, and that by rocking the shaft 64 through a small angle, the intermediate pinion 66 is alternately thrown into and out of mesh with these pinions. Now the shaft 64 passes through the housing 2 to the front side thereof, Figure 3, and fixed to its forward end is an upstanding cam lever 84 having pointed or inverted V-shaped cam faces 84a at its upper end. Bearing on the cam faces 84a is a dog 85 in the form of a lever arm having a head 85a with V-shaped cam faces adapted for bearing contact with the correspondingly shaped cam faces 84a of the lever 84. The opposite end of the dog is pivotally connected with a rocker arm 86 pivotally mounted at its upper end on a pivot pin 87 anchored in the housing 2 just below its upper edge and to one side (right) of the cam lever 84, and in vertical alignment with the pendulum 17 previously described. The lower end of the rocker arm 86 is pivotally connected with the upper end of the pendulum 17 while the dog 85 is pivotally connected at 85b with the rocker arm 86 just below the pivot pin 87. On either side of the rocker arm 86 near its lower end are stop pins 86a, 86a which limit the swinging movement thereof to approximately 5° on either side of its vertical position. To hold the dog in yielding contact with the cam lever 84, a flat leaf spring 88 mounted on a bracket 88a bolted to the face of the housing 2 bears upon the top edge of the dog.

It will be noted, that the point of pivotal connection between the rocker arm 86 and pendulum lever arm 17 is located just above the rack bar 75 and substantially in horizontal alignment with the axis of the rock shaft 64. Now, fixed to the rack bar 75 some distance to the right (Figure 3) and beyond the guide 75a is an upstanding bracket 89 supporting an endwise adjustable push rod 90 extending horizontally toward the lower end of the rocker arm 86 and having an outwardly projecting transverse contact pin 90a at its extremity. A similar push rod 91 is mounted on the opposite side of the rocker arm 86, being endwise adjustably secured in the end frame member 78 of the carriage and having a corresponding contact pin 91a (Figure 3). Now these push rods moving endwise with the carriage 11 are set so that their pins 90a and 91a come into contact with the end of the rocker arm 86 just in advance of the end of the stroke or travel of the carriage in each direction. Thus assuming (as in Figure 3) that the carriage is just commencing its stroke in a direction to the right, the push rod 90 on the right has just broken contact with the rocker arm 86 which thereupon is swung to a vertical position by the weight of the pendulum, and so remains until it is shifted to the right by the left-hand push rod 91 which is approaching it. In the position of the parts as shown, the dog 85 is bearing against the left cam face 84a of the cam lever 84 and holds the same slightly tilted to the left of its vertical position, in which its integral rock lever 65 on the back of the housing (since both are keyed to the rock shaft 64) is shifted in the same direction (to the left in Figure 4) so that the drive is through the left-hand pinion 62. Now, when the push rod 91 on the left (Figure 3) strikes the rocker arm 86 just before the end of the stroke to the right is completed, the rocker arm 86 is shifted from its vertical position to the right, at the same instant sliding the dog 85 over the tip of the cam lever 84. The spring pressure on the dog plus the inclination of the cam faces 84a quickly shifts the same to the left and simultaneously throws the intermediate pinion 66 out of mesh with the worm-driven pinion 62 and into mesh with the other pinion 63 turning in a reverse direction, which reverses the entire train of gearing and the carriage immediately starts its return movement.

As before stated, the driving mechanism is carefully adjusted and timed so that the reversal occurs just at the completion of the winding of the last turn of each layer of wire on the coil. This adjustment is made through the hand wheel 77 on the shaft 73 carrying the pinion 74 meshing with the rack bar 75 of the carriage, the friction connection between said shaft and the gear wheel 72 permitting the shifting of the carriage without disturbing the driving gear train or turning the spindle.

Before leaving the wire winding mechanism, the train connecting the spindle with indicating dial pointers will be described. Referring to Figures 5 and 6, it will be noted that on the rear face of the housing 2 is another gear train driven from the right-hand worm-driven gear wheel 59 through a small pinion 92 mounted on a stub shaft 93 journalled in the rear wall of the housing. On this stub shaft and exterior of the housing is also mounted a large pinion 94 and a worm 95. At the lower end of the vertical cylindric housing 52 integral with the main housing 2, is mounted a large worm wheel 96 meshing with the worm 95 and keyed to the end of a hollow shaft 97 extending axially of the cylindric housing through the center of the dial and carrying at its upper end the lower pointer 54. This gearing aside from being a speed reduction train has a ratio between gears such that for every 10000 revolutions of the spindle the pointer 54 makes one complete revolution of the dial, which is graduated accordingly. It is this pointer 54 which trips the dog 50 after the completion of each revolution or 10000 turns of wire, thus automatically releasing the brake lever and stopping the winding mechanism as before described.

Another gear train is driven from the large pinion 94 on the stub shaft 93 for rotating the other pointer 53 on the dial. A gear wheel 98 mounted on a stub shaft 99 meshes with said gear wheel 93, said shaft also carrying a spiral pinion 100 which meshes with a spiral gear 101 mounted at the lower end on a shaft 102 extending axially through the hollow shaft 97 and carrying at its upper end the pointer 53. This gearing is reduced to a 100 to 1 ratio so that for every 100 revolutions of the spindle the pointer makes one revolution on the dial, thus enabling the number of turns to be counted in hundreds as well as thousands.

The mechanism which controls the operation of the feed table 12, and more particularly the timing of the rotation of the auxiliary motor 14 so that the table will be rocked forwardly at the precise moment that the sheets of insulating paper are to be fed into the coil, will now be described in detail: Connected with the cam lever 84 (Figure 3) is an L-shaped bar or link 103 having a short vertical portion 103a pivoted at its end to said lever and a long horizontal portion 103b extending beneath the rack bar 75 to a point opposite the edge of the disc 14a on the armature shaft of the motor 14, where it is pivotally connected intermediate the ends of a vertically arranged escapement lever 104, supported at its lower end on a bearing bracket 105 bolted to the table 1. At the upper end of the escapement lever is an escapement yoke 106 having a pair of spaced fingers 106a, 106a projecting at right angles to the lever and toward the disc 14a. Extending across the outer face of the disc 14a is a slot 14b offset from the center thereof, and within this slot is mounted a relatively stiff spring blade 107 extending longitudinally of said slot with its free end projecting beyond the periphery of the disc 14a and adapted for bearing upon one or the other of the escapement fingers 106a. The blade 107 is slightly less than the width of the space between the escapement fingers so that the blade can pass between them. As shown in Figure 2, the normal position of the disc 14a of the motor, when the feed table is at rest in retracted position, is such that the blade 107 is substantially horizontal with its end resting on top of one of the escapement fingers 106a (say, the one on the left). Moreover, the disc rotates in a counter-clockwise direction (Figure 7) when current is supplied to the motor, this taking place whenever the mercury switches 16, 16 mounted on the pendulum are tilted, which occurs just an instant before the carriage reaches the end of its travel in both directions, the rocking of the pendulum lever being due to the push rods 90 and 91 striking the upper end of the pendulum and swinging it alternately in opposite directions from its normal vertical position which it occupies at all times except at the end of each stroke of the carriage. Thus, as the carriage approaches the end of the stroke travelling to the right, the pendulum is swung as the left-hand push rod 92 strikes the upper end, thus tilting the right-hand mercury switch 16 and closing the circuit through the motor. This immediately puts the motor under power, but it cannot function because the blade 107 is bearing on the escapement finger 106a. However, there is a slight rotative movement due to the resiliency of the blade which is thus placed under tension. However, at the next instant the dog 85 shifts the cam lever 84 with the result that the link 103 connecting said cam lever with the escapement lever, actuates the latter with a corresponding rocking motion, which withdraws the escapement finger 106a from beneath the tensioned blade 107, thereby allowing the motor to make a complete revolution during which the feed table is rocked toward the mandrel and back (Figure 7). But with the shifting of the escapement lever to release the blade 107 held by one finger 106a it brings the other finger into the path of the blade so that it again comes to rest after one revolution is completed, the current to the motor having meanwhile been shut off by the swinging of the pendulum into its normal vertical position. When the carriage reaches the end of its next stroke, the same series of events take place, except that the escapement lever is now shifted in the opposite direction, the blade being released by one escapement finger and caught by the other after each revolution of the motor.

The action of the rocking table will be understood from the following: Just before the carriage reaches each end of its stroke, the operator places a sheet of waxed insulating paper S onto the table with its forward edge projecting slightly beyond the table, holding the same in place with the fingers as shown in Figure 7, during the forward rocking of the table, which carries the forward edge of the sheet into contact with the revolving coil to be immediately wrapped around the layer of wire just wound onto the coil, thus separating and insulating it from the next layer about to be wound.

Referring to the spool rack 6, Figures 9 and 10 show the manner in which the spools 8 are supported and feeding of the wire to the coils is controlled. The rack shown is made up of several slotted horizontal bars 108 elevated one above the other, the U-shaped spool reels 7 being mounted on these bars by means of bolts 109 and wing nuts 109a passing through the vertical slots in the bars. The spools are first threaded onto spindles 110, the projecting ends of which are dropped into vertically grooved blocks 111 mounted at the upper ends of the reels, one of the blocks being attached to a leaf spring 112 permitting it to be shifted to allow the spools to be readily removed. Inwardly from one end of each spindle is attached a brake drum 113, preferably consisting of a disc of wood somewhat smaller than the end face of the spool and bearing against the same is held against rotation relative thereto by a pin 113a engaging a recess in said spool.

To the base of each spool reel 8 and in alignment with the brake drum 113 is a bracket 114 pivoted to swing toward and from the spool, the same normally assuming a forwardly and upwardly inclined position. A coil spring 115 is attached to the bracket and to the end of a rearwardly extending arm 117 integral with the base of the spool holder. The end portion of the bracket is U-shaped, and along its inner flange is clamped a brake shoe 117 adapted to bear against the periphery of the brake drum 113. Pivotally mounted at the base of the bracket 114 is a long rod 118 extending some distance forwardly and beyond the bracket and resting against the end of a leaf spring 114a secured to the bracket. At the end of the rod 118 is a grooved pulley 119 over which the wire $w$ from the spool passes before being carried forwardly to the guide pulley 9. Under normal winding operations the tension on the wire as it is fed from the spool is sufficient to depress the lever rod 118 and hold the bracket against the tension of the spring 115 in such position that the brake shoe is out of contact with the brake drum 113 with the result that the spool turns freely as the wire is fed therefrom. However, at the instant the winding is stopped or a wire breaks, this tension is instantly relieved, with the result that the bracket is shifted by the spring 115, bringing the brake shoe 117 in contact with the spool brake drum 113, immediately stopping the spool from further rotation until the winding operation is resumed. While this device is not essential to the operation of the machine as a whole, it is an advantageous arrangement in that it automatically tensions the wire as it is fed from the spools, and makes for ease and time saving in threading the numerous strands onto the cores at the start of each winding operation.

The several features of construction and design embodied in the machine herein described may obviously be modified without departing from the spirit of my invention, and therefore I do not wish to be limited except in so far as the invention is set forth in the appended claims.

I claim as my invention:

1. In a coil winding machine, the combination of a driven spindle, means for supporting a core for rotation by said spindle, means for guiding wire from a spool onto said core including a reciprocating carriage, and means for introducing sheets of insulating material between successive layers of wire in said coil comprising a shiftable table, a prime-mover operatively connected with said table, and means controlled by said carriage for effecting the actuation of said table to and from said core by said prime-mover at predetermined intervals in the winding operation.

2. In a coil winding machine, the combination of a driven spindle, means for supporting a core for rotation by said spindle, means for guiding wire from a spool onto said core including a reciprocating carriage driven from said spindle, carriage reversing mechanism driven by said spindle, means for introducing sheets of insulating material into said coil comprising a table adapted to shift to and from said coil, a motor operatively connected with said table, a switch in the circuit of said motor, means carried by said carriage for opening and closing said switch at the end of each reciprocation of said carriage, and auxiliary means operatively connected with said carriage reversing mechanism, and acting to hold said motor momentarily against movement while said switch is closed and to release the same at the instant of reversal of said carriage.

3. In a coil winding machine, the combination of a driven spindle, means for supporting a core for rotation by said spindle, means for guiding wire from a spool onto said core including a reciprocating carriage operatively connected with said spindle, means for feeding sheets of insulating material onto said coil at predetermined intervals in the winding thereof, comprising a material supporting table mounted to shift toward and from said coil, a motor operatively connected with said sheet feeding table, a switch in the circuit of said motor, an escapement adapted to hold said motor against rotation, and mechanism driven from said spindle for operating said switch and actuating said escapement to time the feeding of said sheets with the reciprocation of said carriage.

4. In a coil winding machine, the combination of a driven spindle, means for supporting a core for rotation by said spindle, means for guiding wire from a spool onto said core including a reciprocating carriage, speed reducing gearing and carriage reversing mechanism interposed between said spindle and said carriage, means for feeding sheets of insulating material into said coil at predetermined intervals in the winding thereof, comprising a sheet supporting table mounted to shift toward and from said coil, a motor operatively connected with said sheet feeding table, a switch in the circuit of said motor, means carried by said carriage for closing said switch at the end of each stroke of said carriage, and escapement mechanism normally holding said motor against rotation and operatively connected with said carriage reversing mechanism for releasing said motor after its switch is closed to effect the shifting of said table at predetermined intervals in the reciprocation of said carriage.

5. In a coil winding machine, the combination of a driven spindle, means for supporting a core for rotation by said spindle, means for guiding wire from a spool onto said core including a reciprocating carriage operatively connected with said spindle, means for feeding sheets of insulating material to said coil at predetermined intervals in the winding thereof comprising a material supporting table mounted to shift toward and from said coil, a motor operatively connected with said table, a switch in the motor circuit, an escapement lever normally holding said motor against rotation, and means operative by said spindle for actuating said switch and escapement lever whereby said switch is closed in advance of the release of said motor by said escapement lever at the end of each reciprocation of said carriage.

6. In a coil winding machine, the combination of a driven spindle, means for supporting a core for rotation by said spindle, means for guiding wire from a spool onto said core including a reciprocating carriage operatively connected with said spindle, means for feeding sheets of insulating material onto said coil at predetermined intervals in the winding thereof comprising a material supporting table mounted to shift toward and from said coil, a motor operatively connected with said sheet feeding table, a switch in the power circuit to said motor and operatively connected with said carriage for timing the starting and stopping of said motor with the reciprocations of said carriage.

7. In a coil winding machine, the combination of a driven spindle, a core mandrel mounted to rotate with said spindle, means for guiding a strand of wire from a spool onto said core comprising a reciprocating carriage having a guide pulley thereon, speed reducing gearing driven from said spindle and including a pinion meshing with rack teeth on said carriage and carriage reversing mechanism operative to reverse the direction of travel of said carriage at the end of each stroke, a rocking table movable to and from said coil and adapted to support sheets of insulating material to be fed onto said coil at predetermined intervals, a motor operatively connected with said table, a switch in the power circuit of said motor and operatively connected with said carriage reversing mechanism for closing said motor circuit immediately in advance of reversal of the travel of said carriage, and escapement mechanism normally holding said motor against rotation and operatively connected with reversing mechanism for timing the release of said motor with the reversals of said carriage.

8. In a coil winding machine, the combination of a driven spindle, a core mandrel mounted to rotate with said spindle, means for guiding a strand of wire from a spool onto said core comprising a reciprocating carriage having a guide pulley thereon, speed reducing gearing driven from said spindle and including a pinion meshing with rack teeth on said carriage, carriage reversing mechanism comprising a rocking lever shiftable to reverse the direction of travel of said carriage at the end of each stroke, contact members on said carriage for shifting said rocking lever, a rocking table movable to and from said coil and adapted to support sheets of insulating material to be fed onto said coil at the end of each stroke of said carriage, a motor operatively connected with said table, a switch in the power circuit of said motor and operatively connected with said rocking lever for closing said circuit immediately in advance of reversal of the travel of said carriage, and escapement mechanism normally holding said motor against rotation and operatively connected with said rocking lever for actuation at the exact instant of carriage reversal to simultaneously release said motor to shift said table.

9. In a coil winding machine, the combination of a driven spindle, a core mandrel mounted to rotate with said spindle, means for guiding a strand of wire from a spool onto said core, comprising a reciprocating carriage having a guide pulley thereon, a speed reducing gearing interposed between said spindle and said carriage and including a shiftable reversing gear member, a rocking arm supporting said reversing gear member, a cam lever connected with said rocking arm, a spring actuated cam member engaging said cam lever to shift the same instantaneously, and means mounted on said carriage for actuating said cam member at the end of travel of said carriage through a predetermined length of stroke.

10. In a coil winding machine, the combination of a driven spindle, a core mandrel mounted to rotate with said spindle, means for guiding a strand of wire from a spool onto said core, comprising a reciprocating carriage, a speed reducing gearing interposed between said spindle and said carriage and including a shiftable reversing gear member, a rocker arm carrying said reversing gear member, a cam lever connected with said rocker arm, a spring actuated cam member engaging said cam lever to shift the same, a lever pivotally connected with said cam member and having its free end adjacent the path of said carriage, the latter having endwise adjustable push rods adapted to actuate said last mentioned lever to effect the shifting of said cam lever and the simultaneous reversal of said carriage at each end of its predetermined stroke.

11. In a coil winding machine, the combination of a driven spindle, a core mandrel mounted to rotate with said spindle, means for guiding a strand of wire from a spool onto said core comprising a reciprocating carriage, a speed reducing gearing interposed between said spindle and said carriage and including a shiftable reversing gear member, a rocker arm carrying said gear member, a cam lever connected with said rocker arm, a spring actuated cam member engaging said cam lever to shift the same, a depending lever having pivotal connection with said cam member intermediate its ends, a pendulum connected with the lower end of said last mentioned lever, and contact members carried by said carriage and adapted to engage said lever in advance of the end of each stroke to rock said lever and pendulum whereby said cam member trips said cam lever to reverse said speed reducing gearing.

12. In a coil winding machine, the combination of a housing, a coil winding spindle mounted in said housing, a reciprocating carriage moving in a path parallel with said spindle and having a wire guiding pulley thereon, carriage driving and reversing gearing operatively connecting said spindle with said carriage including a pair of pinions mounted on said housing and driven from said spindle in opposite directions of rotation, a rocker arm mounted on said housing, a reversing pinion journalled on said rocker arm and shiftable alternately into and out of mesh with said first mentioned pinions, a cam lever operatively connected with said rocker arm and having angularly disposed cam faces at its end, a spring actuated cam dog adapted to engage said cam faces, a lever connected with said cam dog, and means mounted on said carriage for engaging said last mentioned lever at the end of each stroke thereof to effect the reversing of said driving gearing.

13. In a coil winding machine, the combination of a housing, a coil winding spindle mounted in said housing, a reciprocating carriage moving parallel with said spindle and having a wire guiding pulley thereon, gearing interposed between said spindle and said carriage including a carriage reversing mechanism operated by said carriage through a lever shiftable by contact members carried by said carriage, a sheet feeding table adjacent said coil, a motor connected with said table for rocking the same forwardly at the end of each stroke of said carriage, a mercury switch in the power circuit of said motor, a pendulum connected with said lever and supporting said switch, and escapement mechanism including a blade carried by said motor and a lever operatively connected with said carriage reversing mechanism and having escapement fingers coacting with said blade to prevent the rotation of said motor through more than one revolution after each closing of the motor circuit.

14. In a coil winding machine, the combination of a driven spindle, coil winding mechanism driven by said spindle, and means for introducing sheets of insulating material into said coils comprising a table adapted to be rocked toward and from said coils at predetermined intervals, a motor connected with said table for a complete oscillation for each rotation of the motor armature, a mercury switch in the motor circuit, an oscillating support for said switch, means operative by said coil winding mechanism for tilting said switch support to effect the closing of the circuit through said motor, a blade extending radially from the motor armature, an escapement lever mounted adjacent said motor and normally engaging said blade to hold said motor against rotation, and means connecting said escapement lever with said coil winding mechanism for releasing said blade at predetermined intervals to permit the rotation of said motor through one revolution.

15. In a coil winding machine, the combination with a coil winding mechanism of means for introducing sheets of insulating material into said coils comprising a table adapted to be rocked toward and from the coils being wound at predetermined intervals, a motor operatively connected with said table, a switch in the circuit of said motor, an escapement mechanism associated with said motor including a blade extending radially from the axis of the motor armature, an escapement lever mounted adjacent said motor and provided with spaced fingers adapted to project into the path of the end of said blade to normally hold the motor against rotation, means operatively connecting said switch and said escapement lever with said winding mechanism whereby said switch is closed just in advance of the movement of said escapement lever to release said blade.

Signed at Chicago, Ill., this 20th day of August, 1929.

WILLIAM O. MEISSNER.